(12) United States Patent
Irukulapati et al.

(10) Patent No.: US 11,140,707 B2
(45) Date of Patent: Oct. 5, 2021

(54) TIME RESOURCE ASSIGNMENT SIGNALING MECHANISM FOR MSG3 TRANSMISSION

(71) Applicant: Telefonaktiebolaget LM Ericsson (publ), Stockholm (SE)

(72) Inventors: Naga Vishnu Kanth Irukulapati, Gothenburg (SE); Jingya Li, Gothenburg (SE); Xingqin Lin, Santa Clara, CA (US); Jianwei Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/396,974

(22) Filed: Apr. 29, 2019

(65) Prior Publication Data

US 2019/0261407 A1  Aug. 22, 2019

Related U.S. Application Data

(63) Continuation of application No. PCT/EP2019/053772, filed on Feb. 15, 2019.
(Continued)

(51) Int. Cl.
*H04W 72/14* (2009.01)
*H04W 74/00* (2009.01)
*H04W 74/08* (2009.01)

(52) U.S. Cl.
CPC ......... *H04W 72/14* (2013.01); *H04W 74/008* (2013.01); *H04W 74/0833* (2013.01)

(58) Field of Classification Search
USPC ........................................ 370/330
See application file for complete search history.

(56) References Cited

U.S. PATENT DOCUMENTS

| 2014/0003320 A1 | 1/2014 | Etemad et al. |
| 2014/0293881 A1 | 10/2014 | Khoshnevis et al. |
| (Continued) | | |

FOREIGN PATENT DOCUMENTS

| CN | 107466113 A | 12/2017 |
| CN | 107666722 A | 2/2018 |
| (Continued) | | |

OTHER PUBLICATIONS

Notification of Transmittal of International Search Report and the Written Opinion of the International Searching Authority for International Application No. PCT/EP2019/053772 dated May 8, 2019.
(Continued)

*Primary Examiner* — Natasha W Cosme
(74) *Attorney, Agent, or Firm* — Sage Patent Group

(57) ABSTRACT

A method of scheduling Msg3 configuration by a network node may be provided. Information may be generated indicating transmission duration, DMRS configuration, and/or starting position for Msg3 sending by a user equipment, UE. Transmission of signaling of the information to the UE may be initiated for scheduling Msg3 transmission by the UE. A method of scheduling by the UE includes receiving information from the network node indicating transmission duration, DMRS configuration, and/or starting position for Msg3 transmission. The UE transmits Msg3 based on a schedule determined based on the information.

28 Claims, 12 Drawing Sheets

---

Generate information indicating transmission duration, DMRS configuration, and/or starting position for Msg3 sending by a UE — 300

Initiate transmission of signaling of the information to the UE for scheduling Msg3 by the UE — 302

Related U.S. Application Data

(60) Provisional application No. 62/710,573, filed on Feb. 16, 2018.

(56) References Cited

U.S. PATENT DOCUMENTS

| | | | |
|---|---|---|---|
| 2014/0355539 | A1 | 12/2014 | Yang et al. |
| 2016/0219624 | A1* | 7/2016 | Lin ................... H04W 74/085 |
| 2017/0367069 | A1 | 12/2017 | Agiwal et al. |
| 2017/0367120 | A1 | 12/2017 | Murray et al. |
| 2018/0035470 | A1 | 2/2018 | Chen et al. |
| 2018/0054800 | A1 | 2/2018 | Yeo et al. |
| 2018/0070380 | A1 | 3/2018 | Nagaraja et al. |
| 2018/0084593 | A1* | 3/2018 | Chen ................... H04W 76/11 |
| 2018/0198646 | A1 | 7/2018 | Gau et al. |
| 2018/0242367 | A1 | 8/2018 | Kim et al. |
| 2018/0249509 | A1* | 8/2018 | Yi ....................... H04W 48/16 |
| 2018/0338308 | A1 | 11/2018 | Park et al. |
| 2019/0021120 | A1* | 1/2019 | Chen ................... H04W 76/27 |
| 2019/0141742 | A1* | 5/2019 | Zhou ................. H04W 72/048 |
| 2019/0149365 | A1* | 5/2019 | Chatterjee ........... H04L 25/0226 370/329 |

FOREIGN PATENT DOCUMENTS

| | | |
|---|---|---|
| EP | 3277042 A1 | 1/2018 |
| JP | 2015501116 A | 1/2015 |
| KR | 1020110054010 A | 5/2011 |
| RU | 2580668 C1 | 4/2016 |
| WO | 2017030412 A1 | 2/2017 |
| WO | 2017039372 A1 | 3/2017 |
| WO | 2017039374 A1 | 3/2017 |
| WO | 2017091693 A1 | 6/2017 |
| WO | 2017196937 A1 | 11/2017 |

OTHER PUBLICATIONS

Nokia et al., "Summary of Remaining Details on RACH Procedure," 3GPP TSG-RAN WG1#NR1801, R1-1801097, Vancouver, BC, Canada, Jan. 22-26, 2018, 45 pages.

Ericsson, "Remaining Details in UL Transmission Procedures," 3GPP TSG-RAN WG1 AH-1801, R1-1800953, Vancouver, BC, Canada, Jan. 22-26, 2018, 6 pages.

Ericsson, "DL/UL resources allocation," 3GPP TSG RAN1 #92Bis, R1-1805506; Sanya, China, Apr. 16-20, 2018, 15 pages.

Nokia et al., "Remaining details on RACH procedure," 3GPP TSG RAN WG1 Meeting RAN1#92, R1-1802022; Athens, Greece, Feb. 26-Mar. 2, 2018, 12 pages.

Examination report No. 1 for Australian Patent Application No. 2019230956 dated Nov. 28, 2020.

Examination Report for Indian Patent Application No. 201837041625 dated Jan. 21, 2021.

First Office Action for Chinese Patent Application No. 201880092413.3 dated Jul. 30, 2021 (9 pages).

Notice of Preliminary Rejection, including English translation, for Korean Patent Application No. 10-2020-7023586 dated Jul. 1, 2021 (11 pages).

Qualcomm, "Summary of Remaining Details on RACH Procedure," R1-1721689, 3GPP TSG RAN WG1 Meeting 91 Nevada, Reno, USA, Nov. 27-Dec. 1, 2017, 45 pages.

Communication pursuant to Article 94(3) EPC for European Patent Application No. 19711233.7 dated Aug. 13, 2021 (11 pages).

Ericsson, "Remaining Details on RACH procedure," R1-1720941, 3GPP TSG RAN WG1 Meeting #91, Reno, Nevada, US, Dec. 2017, 24 pages.

* cited by examiner

| Index | Slot offset | Start symbol | Symbol length | SLIV |
|---|---|---|---|---|
| 0 | 5 | 0 | 10 | |
| 1 | 5 | 0 | 14 | |
| 2 | 6 | 0 | 10 | |
| 3 | 6 | 0 | 14 | |
| 4 | 7 | 0 | 10 | |
| 5 | 7 | 0 | 14 | |
| 6 | 8 | 0 | 10 | |
| 7 | 8 | 0 | 14 | |
| 8 | 4 | 0 | 10 | |
| 9 | 4 | 0 | 14 | |
| 10 | 3 | 0 | 10 | |
| 11 | 3 | 0 | 14 | |
| 12 | 2 | 0 | 10 | |
| 13 | 2 | 0 | 14 | |
| 14 | reserved | reserved | reserved | |
| 15 | reserved | reserved | reserved | |

TIME RESOURCE ASSIGNMENT SIGNALING MECHANISM FOR MSG3 TRANSMISSION

CROSS REFERENCE TO RELATED APPLICATIONS

This application is a by-pass continuation of PCT International Application No. PCT/EP2019/053772 filed on Feb. 15, 2019, which itself claims the benefit of U.S. Provisional Patent Application Ser. No. 62/710,573, filed on Feb. 17, 2018, the disclosures and content of which are incorporated herein by reference in their entirety.

TECHNICAL FIELD

The present disclosure is related to wireless communication systems and more particularly to how time resource assignments are signaled by such systems.

BACKGROUND

A random access (RA) procedure is a key function in a cellular system. In Long-Term Evolution (LTE), a user equipment (UE) that would like to access the network initiates the random access procedure by transmitting a preamble (Msg1) in the uplink on the Physical Random Access Channel (PRACH). A gNB (next generation Node B or Transmission and Reception Point (TRP), e.g., a base station or access node) receiving the preamble and detecting the random-access attempt will respond in the downlink by transmitting a random access response (RAR, Msg2). The RAR carries an uplink scheduling grant for the UE to continue the procedure by transmitting a following subsequent message in the uplink (Msg3) for terminal identification. A similar procedure is envisioned for (New Radio) NR. FIG. 1 illustrates an example 4-step initial access procedure performed by a UE 10 and a gNB 20 of a NR system.

Referring to FIG. 1, before transmission of the PRACH preamble, the UE 10 receives both a set of synchronization signals (SS) and configuration parameters on a broadcast channel in an SS-block (e.g., NR-PSS, NR-SSS, New Radio Physical Broadcast Channel (NR-PBCH)), possibly complemented with configuration parameters received on yet another channel.

Msg3 Scheduling

Msg3 is transmitted by using a Physical Uplink Shared Channel (PUSCH) channel Besides Msg3 payload, Demodulation Reference Signal (DMRS) is also transmitted to assist the data decoding at the eNB/gNB. In both LTE and NR, for a 4-step random access procedure, the initial transmission of Msg3 is scheduled by the UL grant contained in RAR. The retransmission of Msg3 is scheduled by UL grant over Physical Downlink Control Channel (PDCCH). In LTE, Msg3 repetition can be configured by the UL grant contained in RAR for coverage enhancements for BL/CE UEs.

UL Grant in RAR in LTE

In LTE, The Uplink Grant field in RAR, also referred to as random access response grant field, indicates the resources to be used on the uplink. The size of the uplink (UL) Grant field is 20 bits for Non-BL/CE (Bandwidth-reduced Low-complexity (BL) or Coverage Enhanced (CE)) UEs. The content of these 20 bits starting with the Most Significant Bit (MSB) and ending with the Least Significant Bit (LSB) are as follows:

Hopping flag—1 bit
Fixed size resource block assignment—10 bits
Truncated modulation and coding scheme—4 bits
If a UE is configured with a higher layer parameter pusch-EnhancementsConfig, then:
Repetition number of Msg3—3 bits else (if UE is not configured with the higher layer parameter)
TPC command for scheduled PUSCH—3 bits
UL delay—1 bit
CSI request—1 bit For Narrowband Internet of Things (NB-IoT) UEs, the size of UL grant field is 15 bits, and for BL UEs and UEs in enhanced coverage level 2 or 3, the size of the UL grant field is 12 bits. The contents of the UL grant are listed in Table 6-2 TS 36.213 for BL/CE UE.

Resource Allocation for Msg 3 in LTE

The frequency resource assignment is indicated by the fixed size resource block assignment field in the UL grant contained in RAR. The Msg3 transmission timing for a non-BL/CE UE (without repetition) is defined as follows:

If a PDCCH with associated Radio Access Radio Network Temporary Identifier (RA-RNTI) is detected in subframe n, and the corresponding downlink Synchronization Channel (DL-SCH) transport block contains a response to the transmitted preamble sequence, the UE shall, according to the information in the response, transmit an UL-SCH transport block in the first subframe $n+k_1$, $k_1 \geq 6$ if the UL delay field in RAR is set to zero where $n+k_1$ is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after $n+k_1$ if the field is set to 1.

For BL/CE UE configured with a number of Msg3 PUSCH repetitions, $\Delta$, the UE shall postpone the PUSCH transmission to the next available UL subframe after $n+k_1+\Delta$ if the UL delay field is set to 1.

SUMMARY

According to some embodiments of inventive concepts, a method of scheduling Msg3 configuration by a network node may be provided. An information message may be generated indicating transmission duration, DMRS configuration, and/or starting position for Msg3 sending by a user equipment, UE. Transmission may be initiated of signaling of the information message to the for scheduling Msg3 transmission by the UE.

According to some embodiments of inventive concepts a time resource signaling of the DMRS configuration and/or starting position for Msg3 sending provides support for both slot/non-slot Msg3 transmission. By flexibly configuring DMRS for Msg3 transmission, different use cases can be supported in a more reliable and resource efficient way, thereby improving the UL system capacity and/or reducing random access latency.

According to some embodiment of inventive concepts a method of scheduling by a UE may be provided. An information message may be received from a network node indicating transmission duration, DMRS configuration, and/or starting position for Msg3 transmission. Msg3 transmission may be transmitted based on a schedule determined based on the information message.

According to some embodiments, a network node having a network interface, a processor connected to the network interface, and a memory storing program code that is executed by the processor may be provided. The program code that is executed by the processor to perform operations including generating an information message indicating transmission duration, DMRS configuration, and/or starting position for Msg3 sending by a user equipment, UE, and initiating transmission of signaling of the information message to the UE for scheduling Msg3 transmission by the UE.

According to some embodiments, a user equipment, UE, having a network interface, a processor connected to the network interface, and a memory storing program code that is executed by the processor to perform operations including receiving an information message from a network node indicating transmission duration, DMRS configuration, and/or starting position for Msg3 transmission, and transmitting Msg3 based on a schedule determined based on the information message.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figures 1, 2:
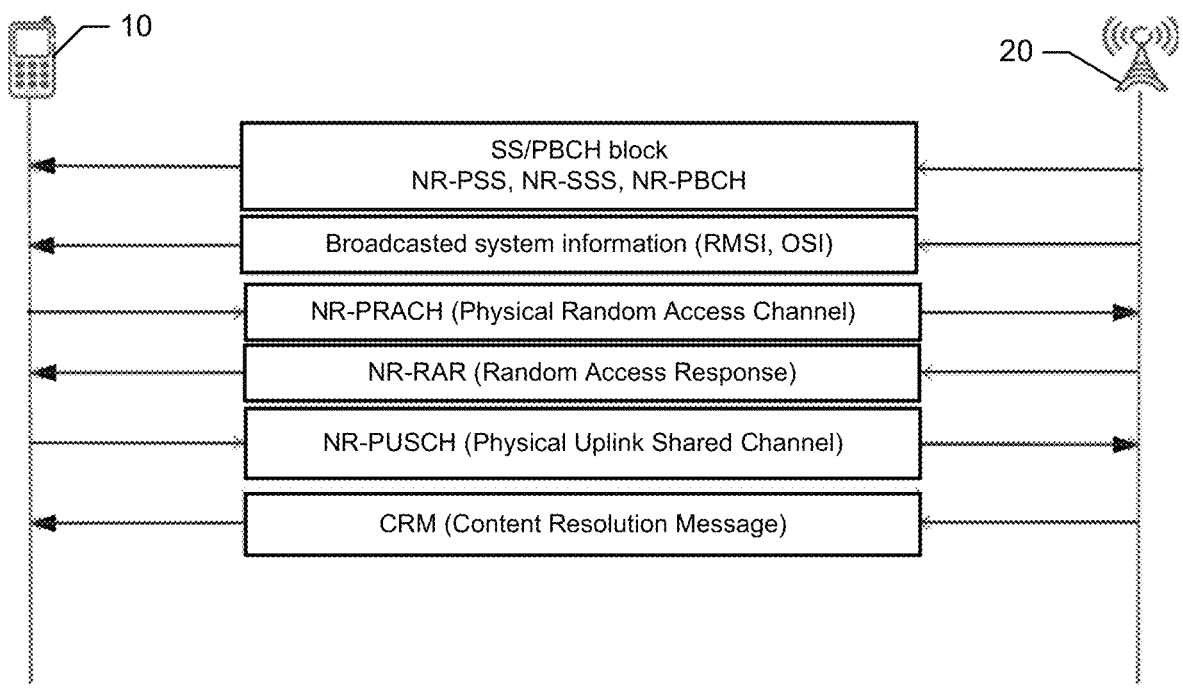
FIG. 1 illustrates an example 4-step initial access procedure performed by a UE and a gNB of a NR system.
FIG. 2 illustrates a time domain assignment table that is used to configure a UE in accordance with some embodiments.
Figure 3:
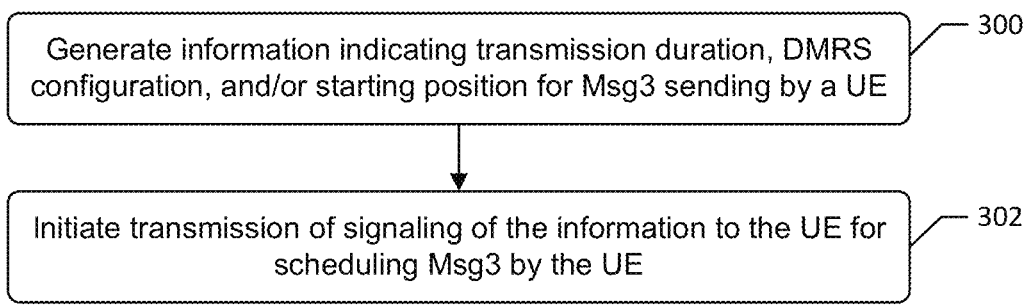
FIG. 3 is a flowchart of operations and methods that can be performed by a network node in accordance with some embodiments.
Figure 4:
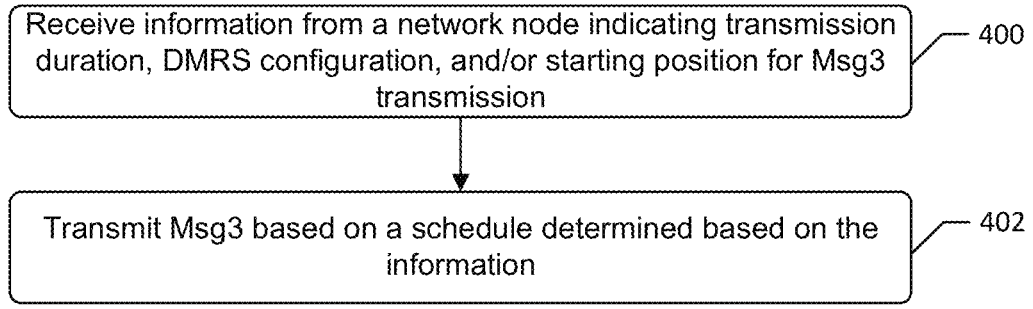
FIG. 4 is a flowchart of operations and methods that can be performed by a UE in accordance some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Problem and Potential Advantages

Various embodiments of the inventive concepts that are disclosed herein may arise from the present realization that in LTE, Msg3 transmission has a fixed transmission duration of one subframe (i.e., 1 ms). In NR, both slot and non-slot based Msg3 (re)transmission are supported. This means that Msg3 transmission can be scheduled with different transmission durations. Therefore, the known approach used in LTE for determining the time resource assignment for Msg3 transmission cannot be reused for NR. For NR random access, a new signaling is needed for indicating the time resource assignment for Msg3 transmission/retransmission/repetition, including the starting position and/or the transmission duration, and/or the DMRS configuration associated to the Msg3 transmission/retransmission/repetition.

Various of these inventive concepts provide a time resource signaling mechanism that supports both slot/non-slot Msg3 transmission. By flexibly configuring DMRS for Msg3 transmission, different use cases can be supported in a more reliable and resource efficient way, thereby improving the UL system capacity and/or reducing random access latency.

Embodiments of the Inventive Concepts

The time resource assignment configuration for Msg3 transmission in NR should consider the minimum gap between RAR and Msg3 specified in NR and the semi-static TDD configuration indicated by higher layer parameters, e.g., in RMSI or Radio Resource Control (RRC). The time resource configuration for Msg3 transmission/retransmission/repetition should also be a function of at least the transmission duration, and/or, DMRS configuration, and/or starting position.

In an embodiment, a signaling is transmitted from a network node to an UE for scheduling Msg3 transmission/retransmission/repetition, where the signaling comprising information indicating the transmission duration, DMRS configuration, and/or starting position for Msg3 transmission/retransmission/repetition.

EXAMPLE 1

Time Resource Assignment Indication as a Function of the Transmission Duration

In this example, we assume that the only 2, 4, 7 and 14 OFDM-symbol durations are supported for Msg3 transmission. A fixed DMRS mapping pattern is assumed for each supported transmission duration. Therefore, a control information field of 2 bits is sufficient to indicate the length of PUSCH carrying Msg3 transmission. The exact time resource to use for Msg3 transmission is based on the 2 bits signaling, the minimum gap between RAR and Msg3, and the DL/UL slot configuration if configured

EXAMPLE 2

Time Resource Assignment Configuration as a Function of the Transmission Duration and Starting Position In this example, UE is configured with a time domain assignment table of x rows (x<=16) giving the OFDM symbols used for MSG3 transmission/retransmission. The table can be a truncated version of a table of 16 rows configured for general PUSCH transmission, or the table is a dedicated table used at least for MSG3 transmission/retransmission. Each row of the table includes a field indicating slot offset relative to the time when the grant is received and a field jointly indicating the start symbol and number of OFDM symbols (or two fields separately indicating the start symbol and number of OFDM symbols). The table can be first configured in system information (e.g. remaining minimum system information (RMSI)) and later optionally reconfigured in RRC. The table can also be fixed table as default and get overwritten by RRC or RMSI if different configuration is preferred. FIG. 2 illustrates a time domain assignment table that is used to configure a UE in accordance with some embodiments (numerology 1).

EXAMPLE 3

Time Resource Assignment Configuration with Configurable DMRS Mapping

In this example, the DMRS mapping used can be further signaled. A fixed DMRS pattern used for MSG3 corresponding to each transmission length (2, 4, 7, or 14 OFDM symbols) can be indicated by higher layer parameters, e.g., in RMSI and/or RRC. Alternatively, a set of DMRS patterns used for MSG3 corresponding to each transmission length (2, 4, 7, or 14 OFDM symbols) are indicated by higher layer parameters, e.g., in RMSI and/or RRC, and RAR grant dynamically indicates which DMRS pattern to use for MSG3 transmission or L1/L2 control signaling indicates which DMRS pattern to use for MSG3 retransmission.

EXAMPLE 4

Time Resource Assignment Configuration with Aggregation

In this example, an aggregation factor can be further signaled. A single aggregation factor used for MSG3 can be indicated by higher layer parameters, e.g., in RMSI and/or RRC. Alternatively, a set of aggregation factors used for MSG3 are indicated by higher layer parameters, e.g., in RMSI and/or RRC, and RAR grant dynamically indicates which aggregation factor to use for MSG3 transmission or L1/L2 control signaling indicates which aggregation factor to use for MSG3 retransmission Other Aspects As one embodiment the time resource assignment configuration can be selected by the network based on some prior information about the UE. For example, the prior information can be obtained by the detected preamble index or preamble group index, where each preamble group index is associated with a particular use case (e.g., mobility, transmit power limitation, UE position, UE capability). The UE could for example determine its Doppler based on its built-in GPS sensors or determine the Doppler based on received DL signals.

The gNB can also determine the frequency offset in the received preamble or how fast the received preamble changes and based on that determine which DM-RS pattern would be suited for Msg3.

As another embodiment, we propose that time allocation (for example scheduling offset) depends on the used numerology (e.g. subcarrier spacing). The dependency can be fixed in the spec and/or configured in system information (e.g., RMSI) and/or RRC.

Figure 5:
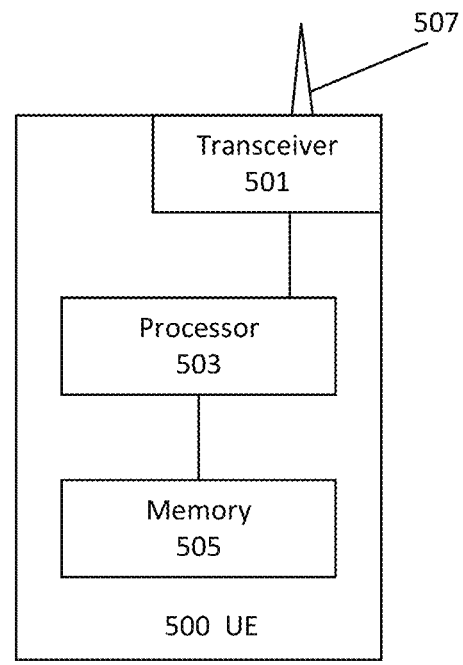
FIG. 5 is a block diagram of a UE configured according to some embodiments.

Example Elements of UE and Network Node:

FIG. 5 is a block diagram illustrating elements of a UE 500 (also referred to as a wireless terminal, a mobile equipment (ME), a wireless communication device, a wireless communication terminal, user equipment, a user equipment node/terminal/device, etc.) configured to operate according to embodiments disclosed herein. The UE 500 may correspond to the UE 10 of FIG. 1. As shown, the UE 500 may include at least one antenna 507 (also referred to as antenna), and at least one transceiver circuit 501 (also referred to as transceiver) including a transmitter and a receiver configured to provide uplink and downlink radio communications with a base station or other radio transceiver element of a radio access network. The UE 500 may also include at least one processor circuit 503 (also referred to as processor) coupled to the transceiver 501, and at least one memory circuit 505 (also referred to as memory) coupled to the processor 503. The memory 505 may include computer readable program code that when executed by the processor 503 causes the processor 503 to perform operations according to embodiments disclosed herein for a UE. According to other embodiments, processor 503 may be defined to include memory so that a separate memory circuit is not required. The UE 500 may also include an interface (such as a user interface) coupled with processor 503.

As discussed herein, operations of the UE 500 may be performed by processor 503 and/or transceiver 501. Alternatively, or additionally, the UE 500 may include modules, e.g., software and/or circuitry, that performs respective operations (e.g., operations discussed herein with respect to example embodiments of UEs).

Figure 6:
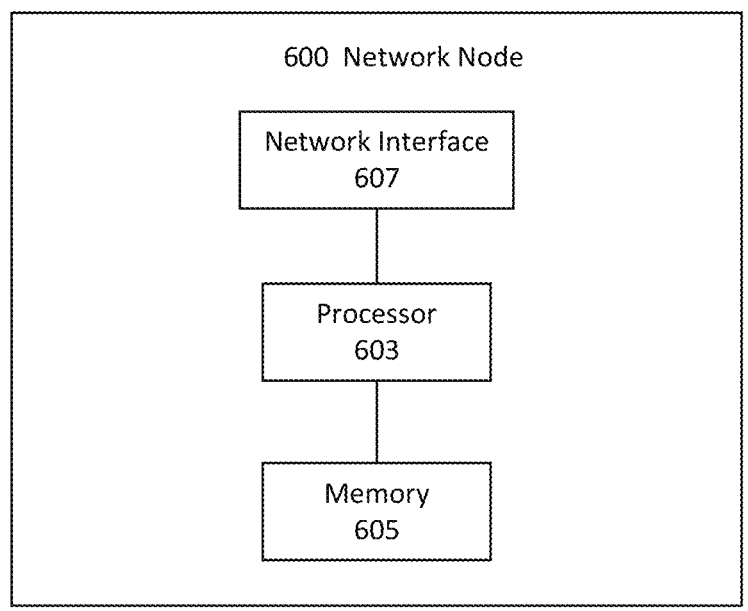
FIG. 6 is a block diagram of a network node configured according to some embodiments.

FIG. 6 is a block diagram illustrating elements of a network node 600 according to one or more embodiments disclosed herein. The network node 600 may correspond to the network node 20 of FIG. 1. As shown, the network node 600 may include at least one network interface circuit 607 (also referred to as a network interface) configured to provide communications with a UE, other network nodes, such as one or more nodes of an access network, a core network, and/or another system node. The network node 600 may also include at least one processor circuit 603 (also referred to as a processor) coupled to the network interface 607, and at least one memory circuit 605 (also referred to as memory) coupled to the processor 603. The memory 605 may include computer readable program code that when executed by the processor 603 causes the processor 603 to perform operations according to embodiments disclosed herein for a network node. According to other embodiments, processor 603 may be defined to include memory so that a separate memory circuit is not required.

As discussed herein, operations of the network node 600 may be performed by processor 603 and/or network interface 607. For example, processor 603 may control network interface 607 to send communications through network interface 607 to a UE, one or more other network nodes, and/or other system nodes, and/or to receive communications through network interface 607. Alternatively, or additionally, the network node 600 may include modules, e.g., circuitry, that performs respective operations (e.g., operations discussed herein with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

Further details of UL transmission procedures for NR shall be discussed.

Activation and deactivation signaling for Type 2 UL transmission without UL grant/DL SPS may be differentiated by different values of two fields in the DCI. The two fields that may be differentiated between activation and deactivation are time domain resource allocation and resource block assignment are as follows:

Time domain resource allocation: One of the un-used fields in the time domain resource allocation used for deactivation Resource block assignment: It is set to all 1's in deactivation In one embodiment, the activation and deactivation of configured grant type 2 may be differentiated by resource block assignment and time domain allocation. To deactivate a configured grant type 2, both the resource block assignment and the time domain resource allocation are set to all 1's.

To activate and deactivate the semi-persistent CSI reporting the same fields could be reused. It is clear that since SPS and SP-CSI use different RNTI's this cannot be any issue.

In an embodiment, for activation and deactivation of SP-CSI reporting, the same two fields that are used for SPS can be used.

UCI on PUSCH

Uplink control information (UCI) may be carried either by physical uplink control channel (PUCCH) or physical uplink shared channel (PUSCH) and contains one or several uplink control information i.e., DL acknowledgement (ACK/NACK), channel quality indicator (CQI) or scheduling request (SR). UCI is transmitted either on PUSCH if the UE transmits user data in the UL or when there is no user data to be transmitted, UCI is carried by PUCCH. The encoding of control data and the corresponding mapping is done as described in sub-clause 5.2.2.6 in 36.212.

Similar to the case of UL transmission with UL grant, for transmission of UCI on PUSCH transmission without UL grant type 1 or type 2, a part of resources can be reserved for transmission of UCI. Also for both types, a set of beta_offset values may be needed, but it may be derived from the beta_offset values used for the dynamic grant.

In another embodiment for UCI on configured grant, similar parameters as the ones for the dynamic grant can be used.

UL Grant for Msg3 in RAR

RAR Grant

As part of the random access procedure, after receiving Random Access Request in MSG1, gNB may provide the required information in MSG2—Random Access Response (RAR) message—for UE to send the MSG3 (RRC Connection Request). This is referred to the RAR Grant in the physical layer. In LTE, RAR Grant is a 20-bit message with contents from MSB to LSB as Error! Reference source not found.:

Hopping flag—1 bit

This is 1 bit of information which governs whether frequency hopping is enabled or not. If the value of the bit is 1 and resource block assignment is type 0, UE should perform PUSCH frequency hopping.

Fixed size resource block assignment—10 bits if $N_{RB}^{UL} \leq 44$

Truncate the fixed size resource block assignment to its b least significant bits, where $b=\lceil \log_2(N_{RB}^{UL} \cdot (N_{RB}^{UL}+1)/2) \rceil$, and interpret the truncated resource block assignment according to the rules for a regular DCI format 0 else

Insert b most significant bits with value set to '0' after the $N_{UL\_hop}$ hopping bits in the fixed size resource block assignment, where the number of hopping bits $N_{UL\_hop}$ is zero when the hopping flag bit is not set to 1, and is defined in Table 8.4-1 when the hopping flag bit is set to 1, and $b=(\lceil \log_2(N_{RB}^{UL} \cdot (N_{RB}^{UL}+1)/2) \rceil -10)$, and interpret the expanded resource block assignment according to the rules for a regular DCI format 0

Truncated modulation and coding scheme—4 bits

The truncated modulation and coding scheme field is interpreted such that the modulation and coding scheme corresponding to the Random Access Response grant is determined from MCS indices 0 through 15 in Table 8.6.1-1 from TS 36.213

TPC command for scheduled PUSCH—3 bits

It is indicated in 3 bits as a TPC command whose value varies from 0 to 7. TPC command to power mapping is given in Table 6.2-1 from TS 36.213. The TPC command value ranges from −6 dB to 8 dB with a 2 dB step size If a UE is configured with a higher layer parameter pusch-EnhancementsConfig, then this field is used to indicate the Repetition number of Msg3

UL delay—1 bit

If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe n+k1, k1>=6, if the UL delay field is set to zero where n+k1 is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after if the field is set to 1.

CSI request—1 bit

This 1 bit of information determines whether an aperiodic CQI, PMI and RI report can be included in the PUSCH transmission. For contention based Random access CSI field is reserved.

For RAR grant in NR, 20 bits for UL grant in RAR is used, which has the same size as the RAR grant in LTE. It is natural to use a similar RAR grant structure for NR, but certain NR specific design factors need to be considered. These aspects are described in the following:

- For truncated modulation and coding scheme, truncating the MCS tables by only using the first 16 rows of a MCS table without 256 QAM. The specific MCS table used depends on if the network configures OFDM or DFT-S-OFDM may be done for the uplink transmission.
- For TPC command for scheduled PUSCH, 3 bits may be used to indicate a value in the range from −6 dB to 8 dB with a 2 dB step size.
- For CSI request field, it may be useful for the gNB to obtain a CSI report directly during a handover, so a 1-bit field may be used.
- For time domain assignment, the LTE RAR grant is based on an implicit rule, i.e., the UL-SCH transport block is scheduled in the first available UL subframe n+k1, k1>=6, and the transmission is postponed to the next available UL subframe after if the UL delay field is set to 1. NR supports both slot based and non-slot based MSG3 transmissions. For the non-slot based transmission, durations like 2, 4 and 7 OFDM-symbol for the PUSCH may be supported. In NR, UE can be configured with a time domain assignment table of 16 rows giving the OFDM symbols used for PUSCH transmission. For RAR grant, 2 bits may be used for time domain assignment to indicate an entry in a truncated time domain assignment table of 4 rows fixed in the spec or configured by RMSI and/or RRC.
- For frequency hopping flag, intra-slot frequency hopping is supported for MSG3, and thus a 1-bit hopping flag may be needed for RAR grant in NR.
- For fixed size resource block assignment, similar to LTE RAR grant, a NR resource allocation type 1—contiguous RBs with start position and length may be used. With fixed size 20-bit RAR grant and the number of bits used by the above fields, the number of bits left for fixed size resource block assignment is not more than 10. Assuming a ~20-byte MSG3, 6 RBs are needed for MCS=0 and slot based PUSCH transmission with 1+1+1 DMRS configuration. Table 1 shows the maximum number of RBs that can be allocated with NR resource allocation type 1 under some example BWP sizes with start position and length of 1-RB granularity. Considering (1) BWP size in NR can be much larger than the maximum LTE bandwidth and (2) non-slot based MSG3 transmission is supported, the start RB position and length should support x-RB granularity, where x>=1. Some example granularity values are given in Table 2. Like LTE RAR grant,
  - If frequency hopping is not enabled, all the bits assigned to the field of fixed size resource block assignment can be used to indicate the start RB position and length.
  - If frequency hopping is enabled, some MSB bits assigned to the field of fixed size resource block assignment are used for frequency hopping indication and the remaining LSB bits are used to indicate the start RB position and length. The number of MSB bits used for frequency hopping indication depends on how general PUSCH frequency hopping is designed and the frequency hopping configuration needs to be fixed in the spec or signaled in system information and/or RRC.

TABLE 1

Maximum number of RBs that can be allocated with NR resource allocation type 1 with start position and length of 1-RB granularity

| | # of RBs in a BWP: N_RB | | | |
|---|---|---|---|---|
| | $N\_RB = 44$ | $N\_RB = 94$ | $N\_RB = 188$ | $N\_RB = 275$ |
| 10 bits w/o hopping | 44 RBs | 12 RBs | 6 RBs | 4 RBs |
| 10 bits w/2 bits excluded for hopping | 7 RBs | 3 RBs | 2 RBs | 1 RB |

TABLE 2

Proposed granularity of start position and length for fixed size resource block assignment in RAR grant

| | # of RBs in a BWP: N_RB | | |
|---|---|---|---|
| | $N\_RB <= 94$ | $94 < N\_RB <= 188$ | $188 < N\_RB$ |
| Slot based | 1 RB | 2 RB | 4 RB |
| 7 symbols | 2 RB | 4 RB | 8 RB |
| 4 symbols | 4 RB | 8 RB | 16 RB |
| 2 symbols | 8 RB | 16 RB | 32 RB |

The 20-bit RAR grant in NR has contents from MSB to LSB as:

Hopping flag—1 bit

Fixed size time domain assignment—2 bits
  Indicate an entry in a truncated time domain assignment table of 4 rows that is fixed in the spec or configured by RMSI and optionally reconfigured by RRC Fixed size resource block assignment—9 bits
  Indicating the start RB position and length. The start RB position and length should support x-RB granularity, where x depends on BWP size, slot vs. non-slot transmission
  If frequency hopping is not enabled, all the bits can be used to indicate the start RB position and length.
  If frequency hopping is enabled, some MSB bits are used for frequency hopping indication and the remaining LSB bits are used to indicate the start RB position and length.

TPC command for scheduled PUSCH—3 bits
  Indicate a value in the range from −6 dB to 8 dB with a 2 dB step size Truncated modulation and coding scheme—4 bits
  Indicate an entry of the first 16 rows of a MCS table without 256 QAM that depends on the configured OFDM or DFT-S-OFDM for the uplink transmission CSI request—1 bit
  Indicate if an aperiodic CSI report is included in the PUSCH transmission in contention free random access, and is reserved for contention based random access.

REFERENCES

[1] Chairman's note, RAN1#91
[2] 3GPP TS 38.321: "NR; Medium Access Control (MAC); Protocol specification".

Listing of Example Embodiments

Example Embodiments are discussed below. Reference numbers/letters are provided in parenthesis by way of example/illustration without limiting example embodiments to particular elements indicated by reference numbers/letters.

1. A method of scheduling configuration by a network node, the method comprising:
  generating information indicating transmission duration, DMRS configuration, and/or starting position for Msg3 sending by a user equipment, UE; and
  initiating transmission of signaling of the information to the UE for scheduling Msg3 transmission by the UE.

2. The method of Embodiment 1, wherein the information that is generated is configured to control the UE to schedule its transmission of Msg3.

3. The method of any of Embodiments 1 to 2, wherein the information is generated is based on transmission duration of the Msg3.

4. The method of any of Embodiments 1 to 3, wherein the information is generated is based on transmission duration of the Msg3 and starting position of Msg3 transmission within a slot.

5. The method of any of Embodiments 1 to 4, further comprising providing time resource assignment configuration for the Mgs3 transmission with configuration DMRS mapping.

6. The method of any of Embodiments 1 to 5, further comprising providing time resource assignment configuration for the Mgs3 transmission with aggregation.

7. A network node adapted to perform operations according to any of Embodiments 1 through 6.

8. A network node configured to:
  generate information indicating transmission duration, DMRS configuration, and/or starting position for Msg3 sending by a user equipment, UE; and
  initiate transmission of signaling of the information to the UE for scheduling Msg3 transmission by the UE.

9. The network node of Embodiment 8, further configured to perform the method of any of Embodiments 2 through 6.

10. A network node comprising:
  a network interface;
  a processor connected to the network interface; and
  a memory storing program code that is executed by the processor to perform operations comprising:
  generating information indicating transmission duration, DMRS configuration, and/or starting position for Msg3 sending by a user equipment, UE; and
  initiating transmission of signaling of the information to the UE for scheduling Msg3 transmission by the UE.

11. The network node of Embodiment 10, the program code being executed by the processor to perform the method of any of Embodiments 2 through 6.

12. A method of scheduling by a user equipment, UE, the method comprising:
  receiving information from a network node indicating transmission duration, DMRS configuration, and/or starting position for Msg3 transmission; and
  transmitting Msg3 based on a schedule determined based on the information.

13. The method of Embodiment 12, wherein the information is based on transmission duration of the Msg3.

14. The method of any of Embodiments 12 to 13, wherein the information is based on transmission duration of the Msg3 and starting position of Msg3 transmission within a slot.

15. The method of any of Embodiments 12 to 14, further comprising receiving time resource assignment configuration for the Mgs3 transmission with configuration DMRS mapping.

16. The method of any of Embodiments 12 to 15, further comprising receiving time resource assignment configuration for the Mgs3 transmission with aggregation.

17. A user equipment, UE, adapted to perform operations according to any of Embodiments 12 through 16.

18. A user equipment, UE, configured to:
  receiving information from a network node indicating transmission duration, DMRS configuration, and/or starting position for Msg3 transmission; and
  transmitting Msg3 based on a schedule determined based on the information.

19. The user equipment, UE, of Embodiment 18, further configured to perform the method of any of Embodiments 13 through 16.

20. A user equipment, UE, comprising:
  a network interface;
  a processor connected to the network interface; and
  a memory storing program code that is executed by the processor to perform operations comprising:
  receiving information from a network node indicating transmission duration, DMRS configuration, and/or starting position for Msg3 transmission; and
  transmitting Msg3 based on a schedule determined based on the information.

21. The UE of Embodiment 20, the program code being executed by the processor to perform the method of any of Embodiments 13 through 16.

Additional Explanation

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 7:
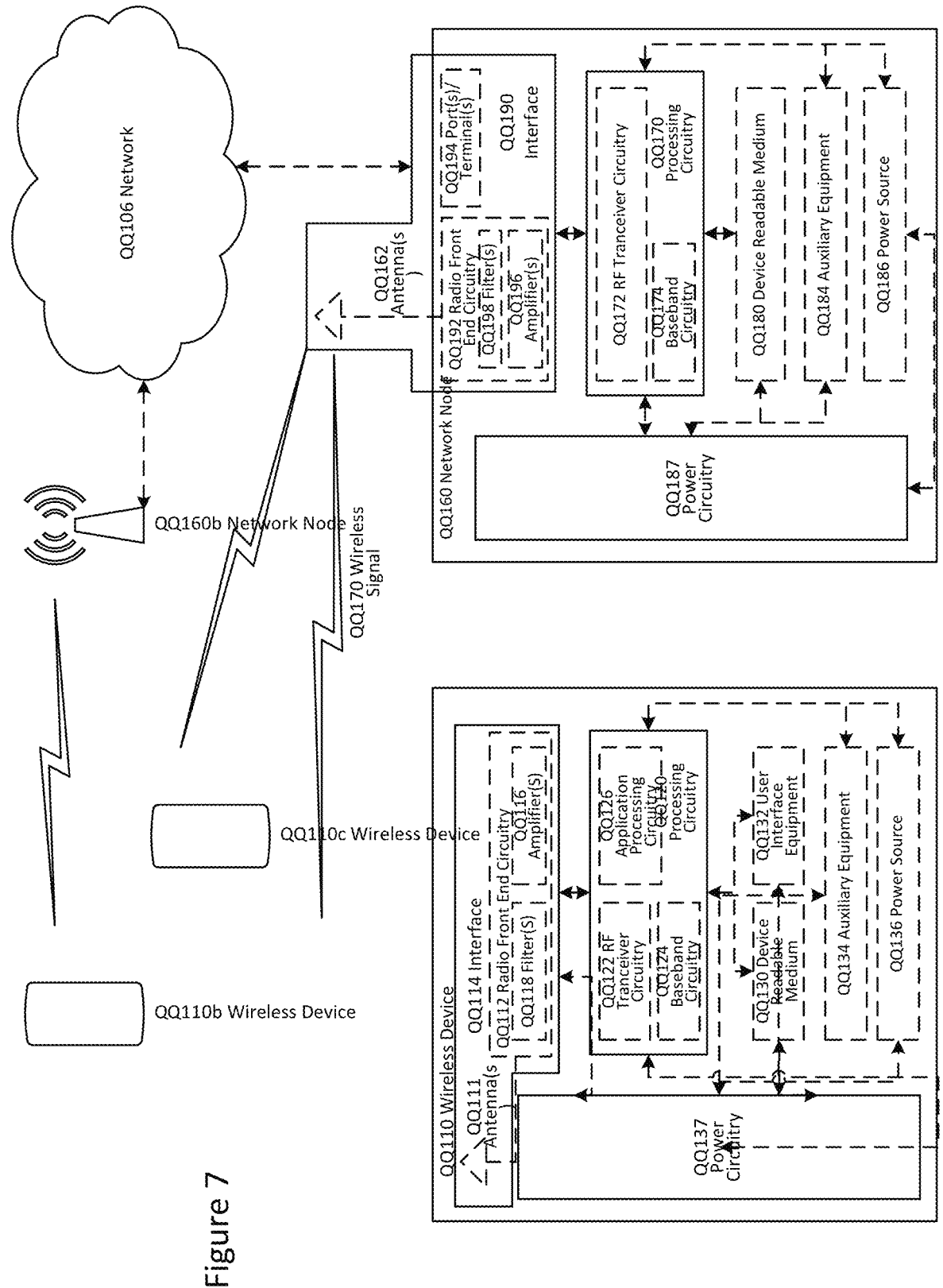
FIG. 7 is a block diagram of a wireless network in accordance with some embodiments.

FIG. 7: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
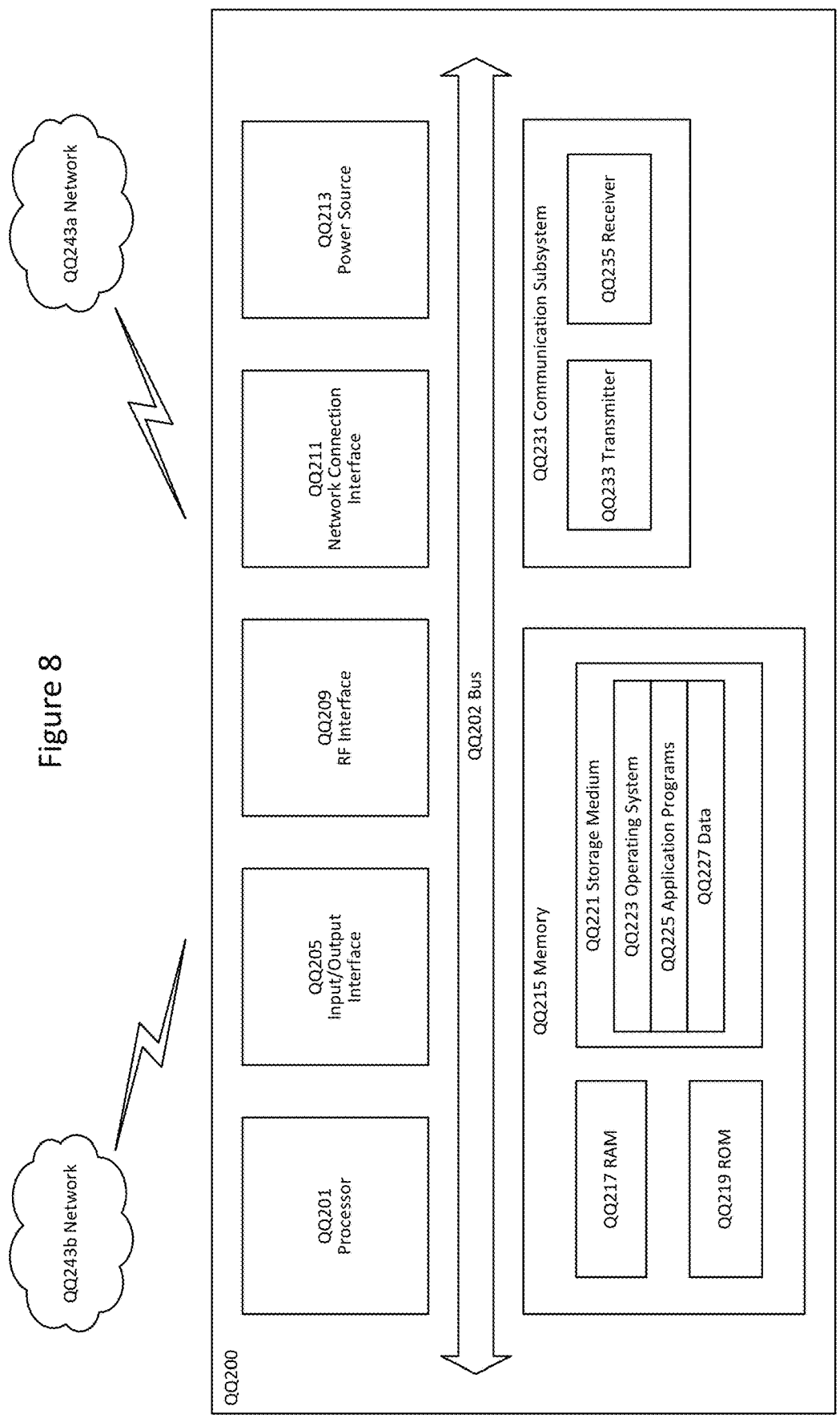
FIG. 8 is a block diagram of a user equipment in accordance with some embodiments.

FIG. 8: User Equipment in accordance with some embodiments

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
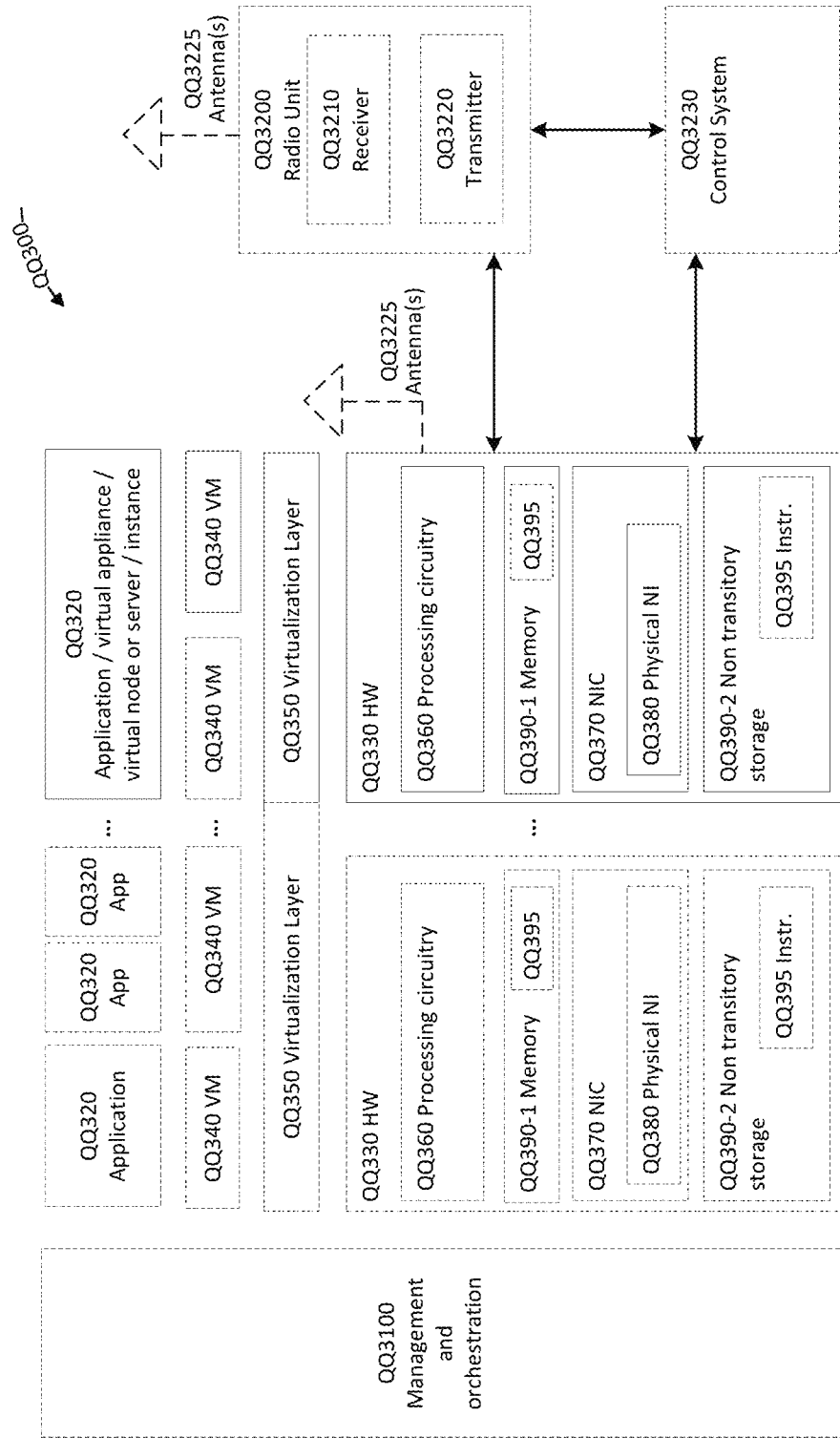
FIG. 9 is a block diagram of a virtualization environment in accordance with some embodiments.

FIG. 9: Virtualization environment in accordance with some embodiments

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
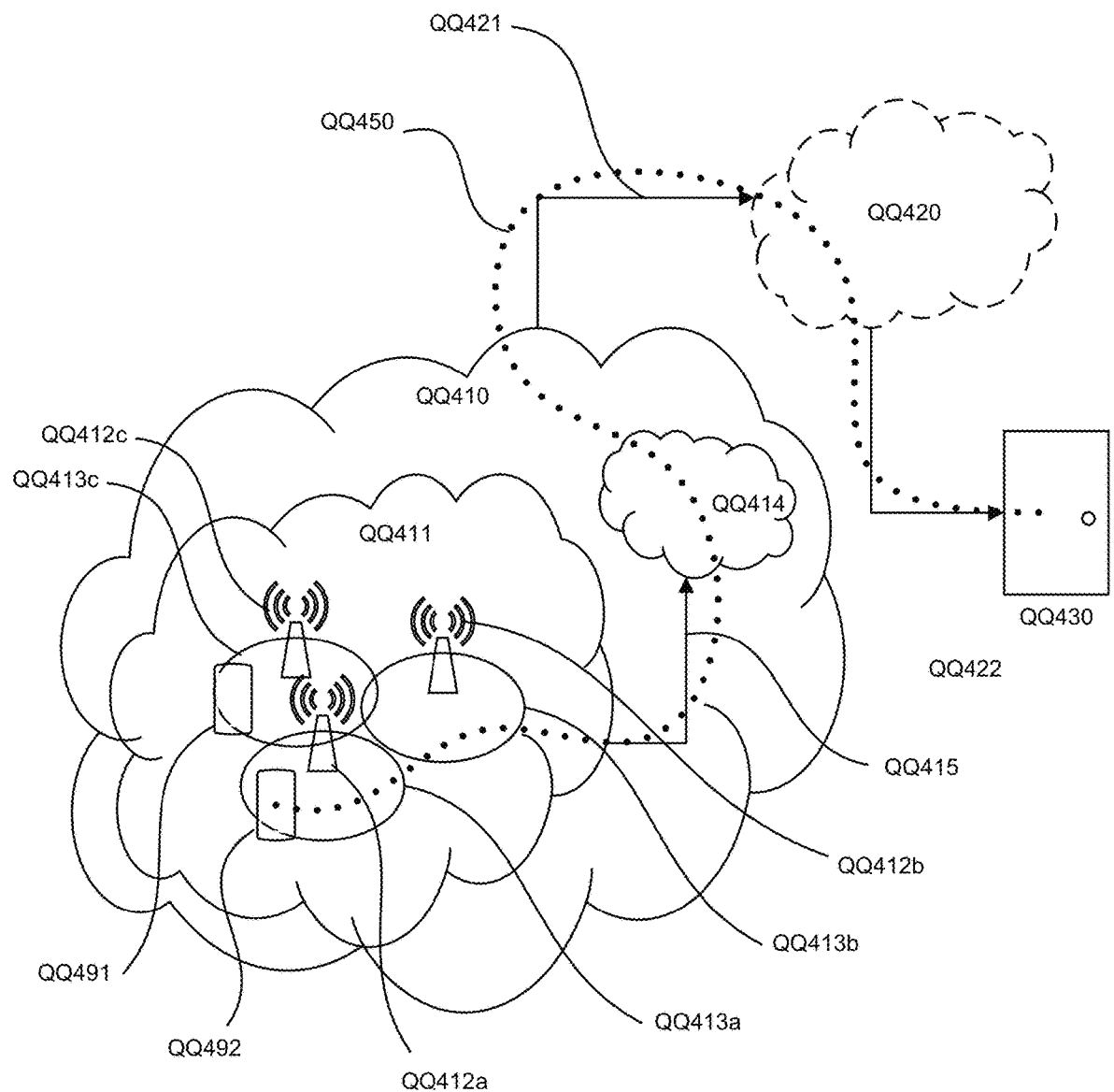
FIG. 10 is a block diagram of a telecommunication network connected via an intermediate network to a host computer in accordance with some embodiments.

FIG. 10: Telecommunication network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
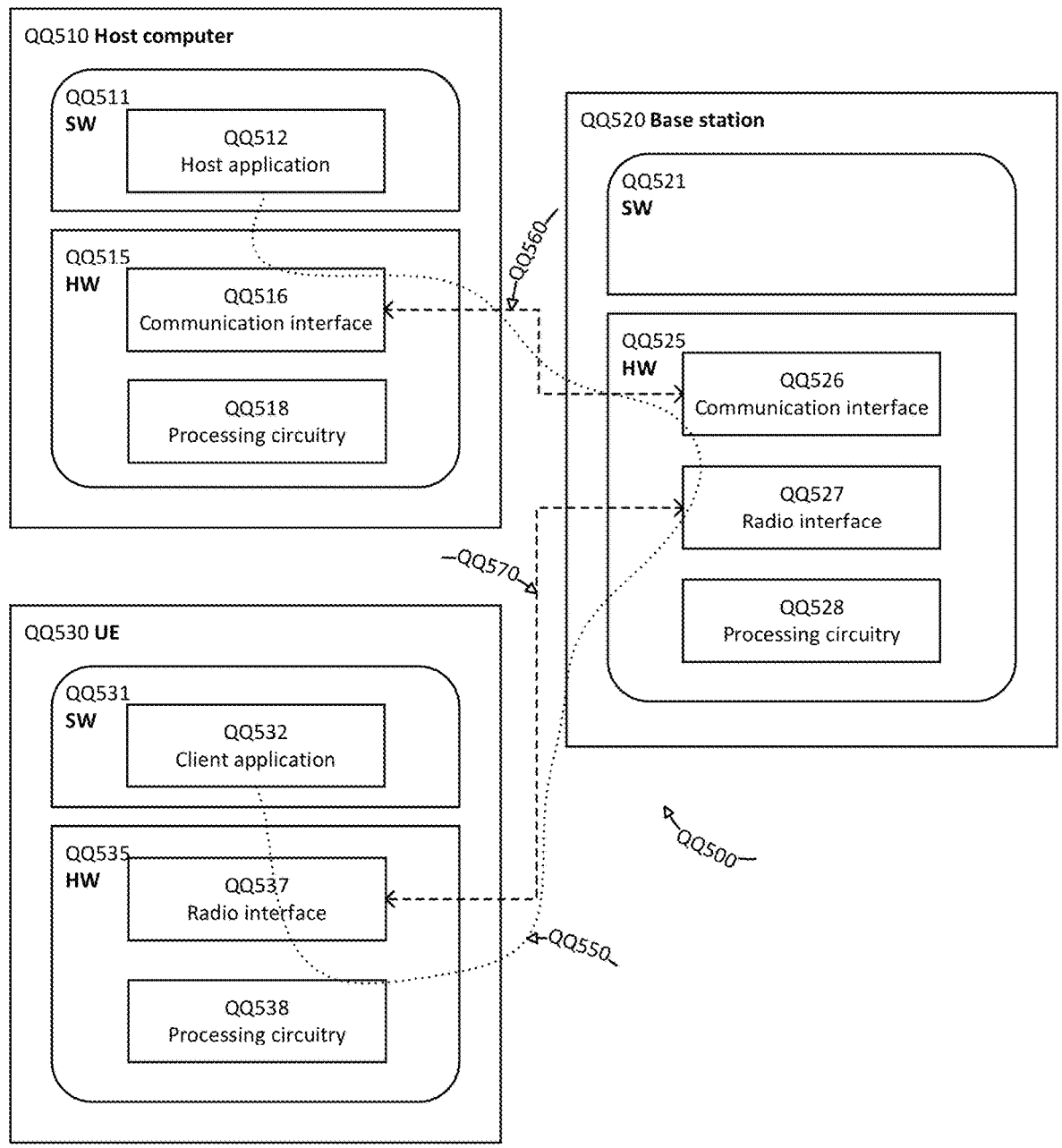
FIG. 11 is a block diagram of a host computer communicating via a base station with a user equipment over a partially wireless connection in accordance with some embodiments.

FIG. 11: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
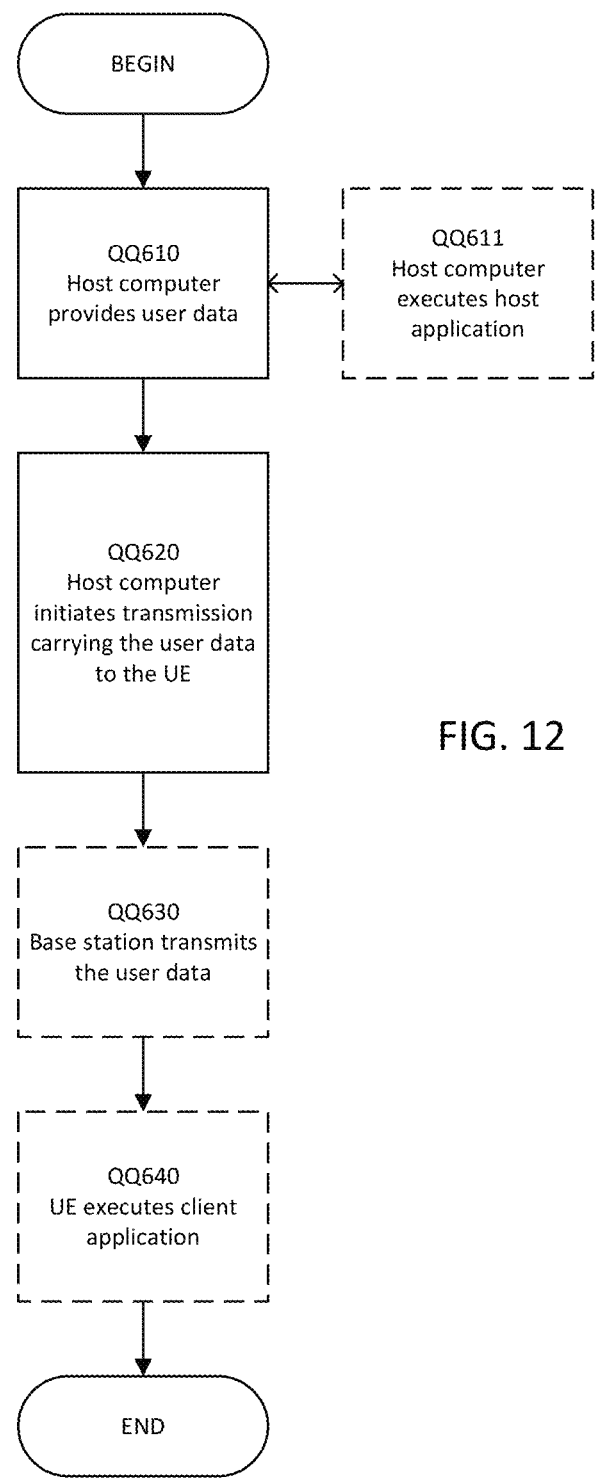
FIG. 12 is a block diagram of methods implemented in a communication system including a host computer, a base station and a user equipment in accordance with some embodiments.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
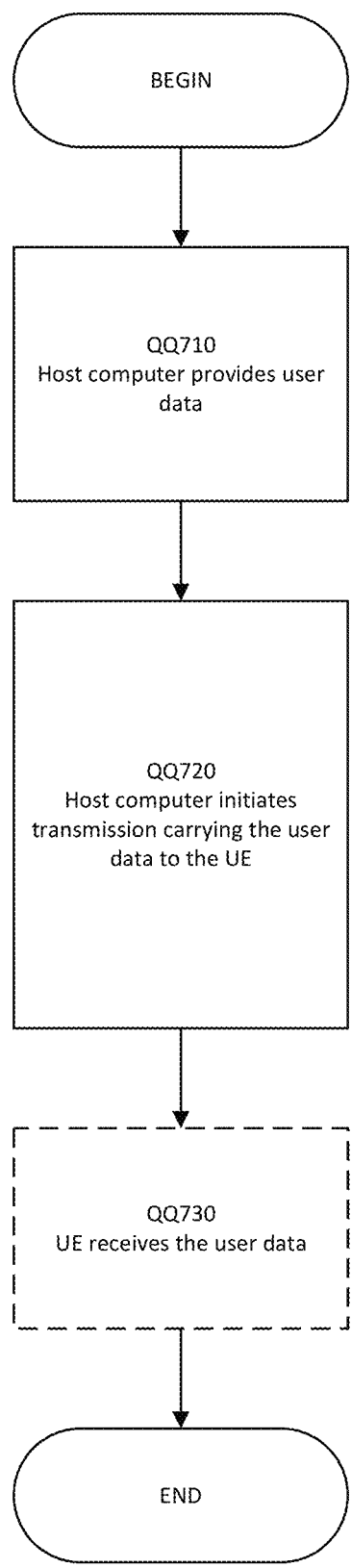
FIG. 13 is a block diagram of methods implemented in a communication system including a host computer, a base station and a user equipment in accordance with some embodiments.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
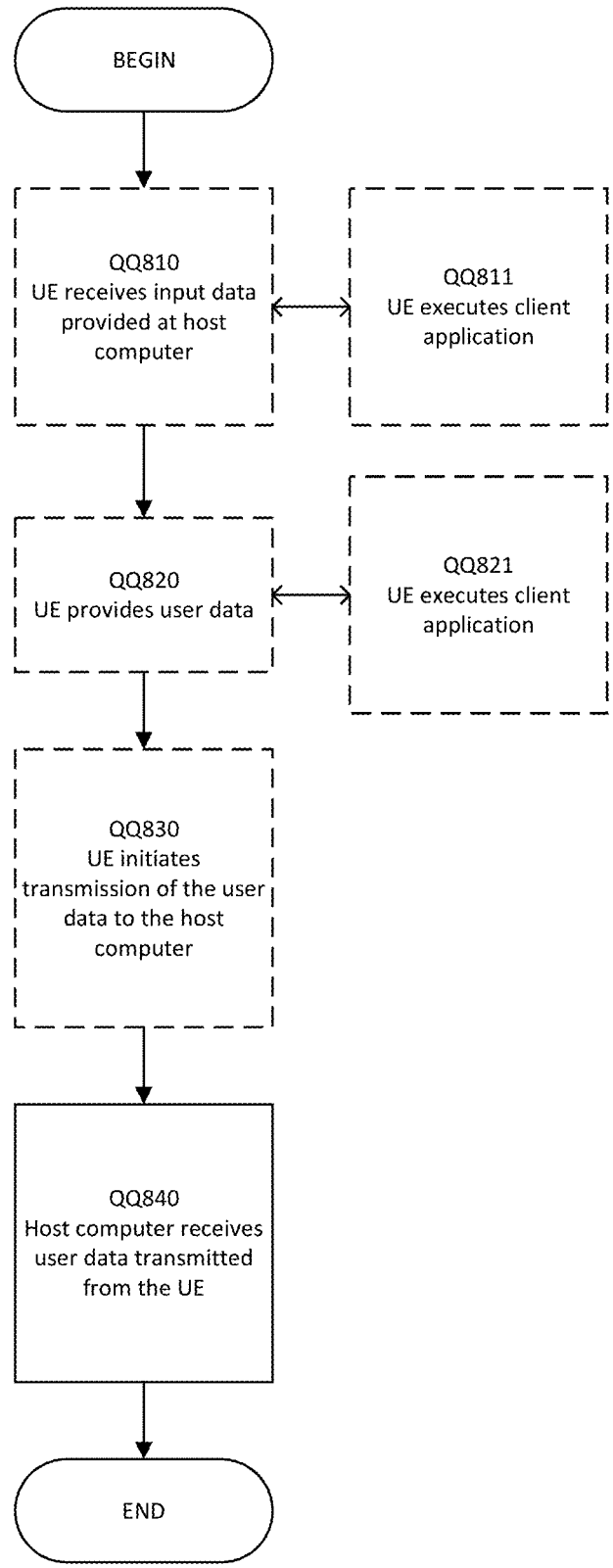
FIG. 14 is a block diagram of methods implemented in a communication system including a host computer, a base station and a user equipment in accordance with some embodiments.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
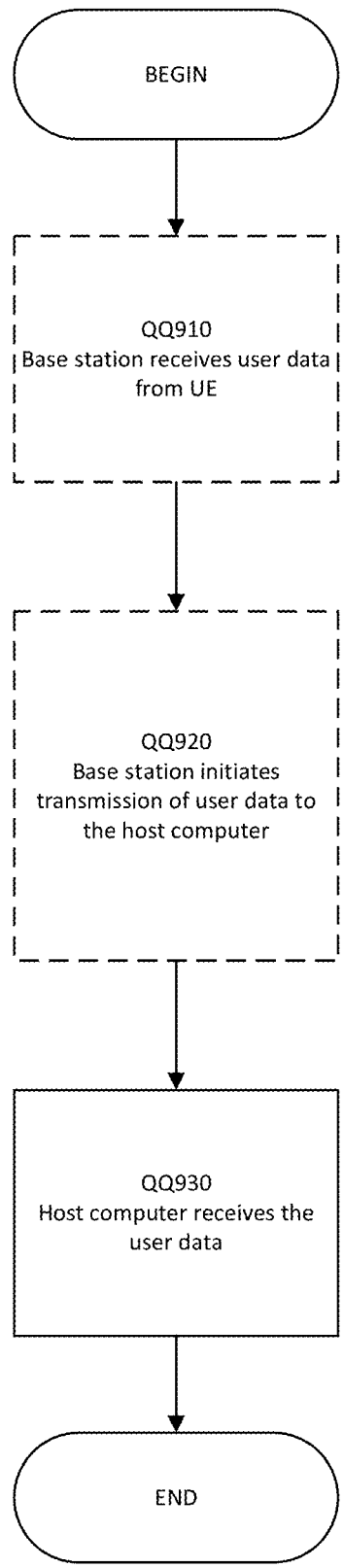
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1x RTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BL Bandwidth-reduced Low-complexity
CA Carrier Aggregation
CC Carrier Component
CCCH SDU Common Control Channel SDU
CDMA Code Division Multiplexing Access
CE Coverage Enhanced
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LBT Listen Before Talk
LIC Local Illumination Compensation
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NB-IoT Narrowband Internet of Things
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RA Random Access
RAN Radio Access Network
RAR Random Access Response
RAT Radio Access Technology
RLM Radio Link Management
RMSI Remaining Minimum System Information
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal TDD Time Division Duplex
TDOA Time Difference of Arrival
TOA Time of Arrival
TRP Transmission and Reception Point
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further Definitions are Provided Below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a network node in a communication network for configuring a Msg3 transmission by a user equipment, UE, of the communication network, the method comprising:
generating an information message providing a transmission duration, a slot offset, a demodulation reference signal, DMRS, configuration, and a starting position for the Msg3 transmission by the UE, the slot offset being dependent on a subcarrier spacing; and
transmitting the information message to the UE for configuring the Msg3 transmission by the UE.

2. The method of claim 1, wherein the information message comprises an indication of an entry in a time domain assignment table.

3. The method of claim 1, wherein the information message is comprised in a Random Access Response Uplink grant.

4. The method of claim 1, wherein a scheduling offset is dependent on the subcarrier spacing.

5. The method of claim 2, wherein the time domain assignment table is configured using radio resource control, RRC.

6. The method of claim 5, wherein the RRC is provided using remaining minimum system information, RMSI.

7. The method of claim 1, wherein a dependency of the subcarrier spacing is configured in system information and/or RRC.

8. A method of operating a user equipment, UE, for scheduling a Msg3 transmission by the UE, the method comprising:
receiving an information message from a network node providing a transmission duration, a slot offset, a demodulation reference signal, DMRS, configuration, and a starting position for the Msg3 transmission, the slot offset being dependent on a subcarrier spacing; and
transmitting the Msg3 transmission based on a schedule determined based on the information message.

9. The method of claim 8, wherein the information message comprises an indication of an entry in a time domain assignment table.

10. The method of claim 8, wherein the information message is comprised in a Random Access Response Uplink grant.

11. The method of claim 8, wherein a scheduling offset is dependent on the subcarrier spacing.

12. The method of claim 9, wherein the time domain assignment table is configured using radio resource control, RRC.

13. The method of claim 12, wherein the RRC is provided using remaining minimum system information, RMSI.

14. The method of claim 8, wherein a dependency of the subcarrier spacing is configured in system information and/or RRC.

15. A network node comprising:
a network interface;
a processor connected to the network interface; and
a memory storing program code that is executed by the processor to cause the network node to perform operations comprising:
generating an information message providing a transmission duration, a slot offset, a demodulation reference signal, DMRS, configuration, and a starting position for the Msg3 transmission by the UE, the slot offset being is dependent on a subcarrier spacing; and
transmitting the information message to the UE for configuring the Msg3 transmission by the UE.

16. The network node of claim 15, wherein the information message comprises an indication of an entry in a time domain assignment table.

17. The network node of claim 15, wherein the information message is comprised in a Random Access Response Uplink grant.

18. The network node of claim 15, wherein a scheduling offset is dependent on the subcarrier spacing.

19. The network node of claim 16, wherein the time domain assignment table is configured using radio resource control, RRC.

20. The network node of claim 19, wherein the RRC is provided using remaining minimum system information, RMSI.

21. The network node of claim 15, wherein a dependency of the subcarrier spacing is configured in system information and/or RRC.

22. A user equipment, UE, comprising:
a network interface;
a processor connected to the network interface; and
a memory storing program code that is executed by the processor to cause the UE to perform operations comprising:
receiving an information message from a network node providing a transmission duration, a slot offset, a demodulation reference signal, DMRS, configuration, and a starting position for a Msg3 transmission, the slot offset being dependent on a subcarrier spacing; and
transmitting the Msg3 transmission based on a schedule determined based on the information message.

23. The UE of claim 22, wherein the information message comprises an indication of an entry in a time domain assignment table.

24. The UE of claim 22, wherein the information message is comprised in a Random Access Response Uplink grant.

25. The UE of claim 22, wherein a scheduling offset is dependent on the subcarrier spacing.

26. The UE of claim 23, wherein the time domain assignment table is configured using radio resource control, RRC.

27. The UE of claim 26, wherein the RRC is provided using remaining minimum system information, RMSI.

28. The UE of claim 22, wherein a dependency of the subcarrier spacing is configured in system information and/or RRC.

* * * * *

UNITED STATES PATENT AND TRADEMARK OFFICE
CERTIFICATE OF CORRECTION

PATENT NO. : 11,140,707 B2
APPLICATION NO. : 16/396974
DATED : October 5, 2021
INVENTOR(S) : Irukulapati et al.

Page 1 of 2

It is certified that error appears in the above-identified patent and that said Letters Patent is hereby corrected as shown below:

In the Drawings

In Figure 7, Sheet 4 of 12, for Tag "QQ172", in Line 1, delete "Tranceiver" and insert -- Transceiver --, therefor.

In Figure 7, Sheet 4 of 12, for Tag "QQ122", in Line 2, delete "Tranceiver" and insert -- Transceiver --, therefor.

In the Specification

In Column 1, Lines 11-12, delete "Feb. 17, 2018," and insert -- Feb. 16, 2018, --, therefor.

In Column 1, Line 43, delete "(SS)" and insert -- (SSs) --, therefor.

In Column 1, Line 50, delete "channel" and insert -- channel. --, therefor.

In Column 2, Line 30, delete "k₁≥6" and insert -- $k_1 \geq 6$, --, therefor.

In Column 3, Line 38, delete "accordance" and insert -- accordance with --, therefor.

In Column 5, Line 7, delete "configured" and insert -- configured. --, therefor.

In Column 5, Line 64, delete "retransmission" and insert -- retransmission. --, therefor.

In Column 7, Lines 43-44, delete "deactivation" and insert -- deactivation. --, therefor.

In Column 15, Line 50, delete "manner" and insert -- manner. --, therefor.

In Column 16, Line 58, delete "QQ190" and insert -- QQ192 --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,140,707 B2

In Column 18, Line 8, delete "(CPE). a" and insert -- (CPE), a --, therefor.

In Column 18, Line 62, delete "comprise" and insert -- comprises --, therefor.

In Column 18, Line 63, delete "QQ114" and insert -- QQ112 --, therefor.

In Column 20, Line 2, delete "manner In" and insert -- manner. In --, therefor.

In Column 20, Line 29, delete "Read Only" and insert -- Read-Only --, therefor.

In Column 21, Line 57, delete "interchangeable." and insert -- interchangeably. --, therefor.

In Column 21, Line 66, delete "power source QQ233," and insert -- transmitter QQ233, --, therefor.

In Column 26, Line 11, delete "(VNE)." and insert -- (VNEs). --, therefor.

In Column 30, Line 52, delete "microprocessor" and insert -- microprocessors --, therefor.

In Column 30, Line 66, delete "according" and insert -- according to --, therefor.

In Column 31, Line 11, delete "an" and insert -- any --, therefor.

In Column 32, Line 3, delete "Services" and insert -- Service --, therefor.

In Column 32, Line 7, delete "Tests" and insert -- Test --, therefor.

In Column 33, Line 15, delete "WLANWide" and insert -- WLAN Wide --, therefor.

In the Claims

In Column 36, Line 11, in Claim 15, delete "being is dependent" and insert -- being dependent --, therefor.